United States Patent [19]
Fling

[11] Patent Number: 4,722,007
[45] Date of Patent: Jan. 26, 1988

[54] TV RECEIVER HAVING ZOOM PROCESSING APPARATUS

[75] Inventor: Russell T. Fling, Noblesville, Ind.

[73] Assignee: RCA Corporation, Princeton, N.J.

[21] Appl. No.: 936,696

[22] Filed: Dec. 2, 1986

[51] Int. Cl.$^4$ .................. H04N 3/22; H04N 5/262; H04N 5/06

[52] U.S. Cl. .................. 358/180; 358/150; 358/183

[58] Field of Search .............. 358/148, 150, 180, 183, 358/903, 22; 340/814

[56] References Cited

U.S. PATENT DOCUMENTS

| | | | |
|---|---|---|---|
| 3,705,328 | 12/1972 | Torok | 358/180 |
| 4,139,799 | 2/1979 | Kureka et al. | 358/180 |
| 4,266,242 | 5/1981 | McCoy | 358/22 |
| 4,495,519 | 1/1985 | Wahlquist | 358/150 |
| 4,638,360 | 1/1987 | Christopher et al. | 358/148 |
| 4,644,405 | 2/1987 | Roy et al. | 358/180 |
| 4,647,970 | 3/1987 | Scemiyoshi | 358/150 |
| 4,667,240 | 5/1987 | Willis et al. | 358/167 |

*Primary Examiner*—Howard W. Britton
*Assistant Examiner*—John K. Peng
*Attorney, Agent, or Firm*—Paul J. Rasmussen; Eric P. Herrmann; Dilip A. Kulkarni

[57] ABSTRACT

A memory-based television receiver includes an apparatus for generating a composite sync signal CSS for timing the memory reading operation and the deflection circuits of the receiver. The horizontal sync components of the internally-generated composite sync signal are locked to the system clock. The vertical sync components of the internally-generated composite sync signal are, on the other hand, locked to the vertical sync components of the incoming video signal.

10 Claims, 4 Drawing Figures

TV RECEIVER HAVING ZOOM PROCESSING APPARATUS

This invention relates to an apparatus for generating a composite sync signal for controlling the deflection circuits of a television receiver while it is in the zoom mode.

BACKGROUND

In a TV receiver having a zoom feature, the incoming composite video signal CVS is sampled and digitized for storage in suitable memory. To produce zoom, a portion of the information stored in the memory is read out in a manner that fills the entire TV screen. To produce a 3-to-1 zoom, for example, each pixel in the designated area of the memory may be repeated three times to stretch out the zoomed portion in the horizontal dimension, and each row of the zoomed portion may be repeated three times to stretch out the picture in the vertical dimension by a factor of 3 to 1 during the memory reading operation.

Typically, the sampling clock signal CLS has a frequency $F_{CK}$ that is four times the color subcarrier frequency $F_{SC}$. Additionally, the clock signal is desirably locked in phase to the color reference burst component of the incoming television signal. This relationship between the color subcarrier signal CSS and the sampling clock signal facilitates chroma/luma separation and chroma demodulation functions in a digital video signal processing system.

In the NTSC standard format, the frequency of the unmodulated color subcarrier signal is established at 3.58 MHz. The horizontal line scanning frequency $F_H$ is established at 2/455 times the color subcarrier frequency (i.e., $F_{SC}=455/2F_H$). Since the sampling clock frequency $F_{CK}$ is set at 4 $F_{SC}$, there are 910 clock pulses or samples in every horizontal line period.

However, not all video signals which are compatible for use in the NTSC system conform precisely to the NTSC standard format. For example, non-standard signals produced by video cassette recorders have jittering timebase errors due to instabilities in their tape transport mechanisms. The timebase jitter results in varying horizontal line periods in the reproduced signal. This produces a variation in the number of clock pulses or samples developed per horizontal line. The variation in the number of clock pulses causes the phase of the sampling clock relative to the horizontal and vertical synchronizing signals to change from line to line. This phase variation, in turn, causes misalignment of the respective picture elements from successive lines of the TV raster.

In order to align the picture elements before they are written into the memory, the input signal samples are time shifted or skew corrected for the phase differences between the incoming horizontal sync pulses IHSP's and the sampling clock pulses CLP's. Additionally, the signal samples read out from the memory are corrected for skew errors prior to their application to the RGB matrix of the TV receiver, commonly-assigned U.S. Pat. No. 4,638,860, and entitled "TIMING CORRECTION FOR A PICTURE-IN-PICTURE TELEVISION SYSTEM", describes illustrative circuitry for correcting timebase errors in the incoming and outgoing signals in a memory-based video signal processing system.

SUMMARY OF INVENTION

In accordance with the principles of the present invention, the signals read out from the memory are not corrected for skew. Additionally, the horizontal and vertical sync components of the incoming video signal are not used for timing the memory read and deflection circuits of the TV receiver. Instead, a new composite sync signal CSS is internally generated for timing these operations.

Pursuant to this invention, the horizontal sync component of the internally-generated composite sync signal CSS is locked to the sampling clock signal so that an integer number of samples (e.g., 900, 901, ... 910) occur in every horizontal line period of a given displayed field. The vertical sync component of the internationally-generated composite sync signal CSS is locked to the vertical sync component of the incoming video signal.

The clock-locked-line feature of the subject invention eliminates the need for correcting skew errors in the signals read out from the memory. The vertical-locked-vertical feature of this invention coordinates the memory writing and reading operations, so that the signals from two different input fields are not combined to define a single output field.

IN THE DRAWINGS

DETAILED DESCRIPTION

Figure 1:
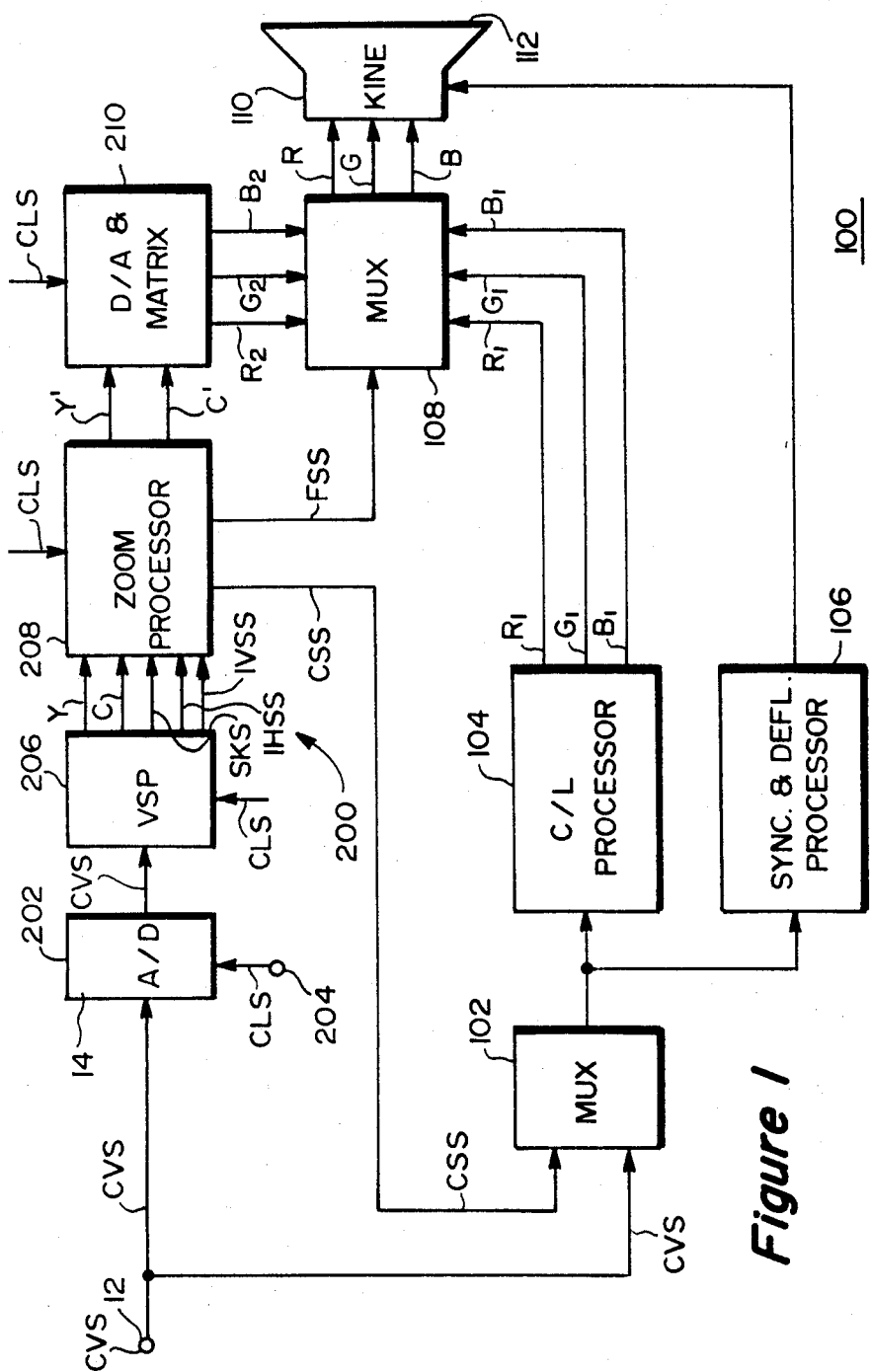
FIG. 1 illustrates a television receiver having a zoom feature incorporating a composite sync signal generating apparatus in accordance with the present invention.

In the DRAWINGS, the lines interconnecting various blocks represent either single conductor connections carrying analog signals or multi-conductor buses carrying multi-bit parallel binary digital signals, as the case may be.

It will be readily appreciated by those skilled in the video signal processing art that the invention may be practiced on either digital or analog representations of the composite video signal.

It is further assumed that the incoming video signal nominally conforms to the NTSC standard format. Examples of signals conforming precisely to the NTSC standard format are the broadcast and cablecast television signals (hereinafter, standard video signals). Examples of signals conforming nominally to the NTSC standard format are video signals produced by a video cassette recorder or a video disc player (hereinafter, non-standard signals).

FIG. 1 is a block diagram of a TV receiver 100 having digital zoom processing circuitry 200 for magnifying a portion (e.g., ⅓) of the image to fill the entire screen. An incoming composite video signal CVS from a suitable source (e.g., video cassette recorder) is applied to an input terminal 12. The input terminal 12 is coupled to an analog-to-digital (A/D) converter 202 and a multiplexor 102. In the normal (non-zoom) display mode, the multiplexor 102 couples the incoming video signal CVS to a chroma/luma processor 104, and a sync/deflection processor 106.

The chroma/luma processor 104, which includes conventional analog circuitry, processes the incoming composite video signal CVS to produce respective red, green and blue component signals $R_1$, $G_1$, and $B_1$ for application to a first set of input terminals of a multiplexor 108. In the normal display mode, the multiplexor 108, responsive to a fast switching signal FSS, continuously applies the $R_1$, $G_1$, and $B_1$ signals from the chroma/luma processor 104 to the respective control terminals of the kinescope electron gun. The fast switching signal FSS is "low" in the normal display mode and "high" in the zoom mode.

The sync/deflection processor 106, having conventional analog circuitry, separates the horizontal and vertical synchronizing pulses from the incoming video signal CVS. The deflection circuits, included in the sync/deflection processor 106, generate horizontal and vertical deflection currents in repsonse to the incoming horizontal and vertical sync pulses IHSP's and IVSP's. The horizontal and vertical deflection currents are applied to the respective horizontal and vertical deflection coils of the kinescope 110 to cause the red, green and blue electron beams to traverse an interlaced raster on the television screen 112.

As the intensity of the red, green and blue electron beams is varied in accordance with the R, G and B signals and as the beams scan a two dimensional raster, moving images are generated on the screen in the manner well known in the art. Conventional circuitry is used for performing the chroma/luma processor functions and the sync/deflection processor functions.

In the zoom mode, the A/D converter 202 samples and digitizes (e.g., 8-bit samples) the incoming video signal CVS at instants determined by the sampling clock signal CLS applied to a port 204. As previously indicated, the sampling clock frequency $F_{CLK}$ is set at four times the frequency $F_{SC}$ of the reference color burst signal BS included in the incoming video signal CVS. The 4 $F_{SC}$ clock signal CLS may be either phase locked to the burst signal BS, or it may be generated by an asynchronous clock.

A digital video signal processor (VSP) 206 processes the incoming digital samples of the composite video signal CVS to generate a luminance signal Y, and a pair of demodulated color difference signals R-Y and B-Y. For convenience, the two color difference signals R-Y and B-Y are identified herein as the chrominance signal C in FIG. 1.

The video signal processor 206 additionally includes circuitry for separating the horizontal and vertical sync signals IHSS and IVSS from the incoming composite video signal CVS, and for generating a skew error signal SKS. As indicated previously, the skew error signal SKS is a measure (in, for example, fractions of a clock or sample period) of the difference between the time of the last clock pulse (or signal sample) occurring immediately before the center of a horizontal sync pulse, and the time of the center of the same horizontal sync pulse.

Reference may be made to a commonly-assigned, U.S. Pat. No. 4,667,240 and entitled "TIMING CORRECTION CIRCUITRY AS FOR TV SIGNAL RECURSIVE FILTER", for a description of skew measurement and correction circuitry.

An integrated circuit (IC), which performs the above-mentioned video signal processor functions, is of the type VSP-2850 developed by ITT Intermetall Semiconductors, Freiburg, W. Germany. Alternately, a combination of IC's—a video processing unit (VPU 2200) and a deflection processing unit (DPU 2500)—both made by ITT Intermetall Semiconductors, may be used to perform the aforesaid functions of the video signal processor 206.

The luma and chroma signals Y and C are supplied by the video signal processor 206 to a zoom processor 208, along with the skew error signal SKS and the horizontal and vertical sync signals IHSS and IVSS. The zoom processor 208 includes skew correction circuitry. The skew correction circuitry, responsive to the skew error signal, delays or time shifts the luminance signal Y in a manner that substantially eliminates the skew errors in the output signal.

The skew errors in the chrominance signal C are not as noticeable as they are in the luminance signal Y (due to smaller bandwidth of the chroma signal). Accordingly, it is not necessary to correct skew errors in the chrominance signal C. A suitable delay is introduced in the chrominance signal path to compensate for the time delay through the luma skew correction circuitry. It will be appreciated, however, that the compensating delay in the chrominance path may be replaced by appropriate skew correction circuitry for the chroma signal C.

The skew-corrected luminance signal Y' and the delayed chrominance signal C' are applied to a field memory under the control of the incoming horizontal and vertical sync signals IHSS and IVSS (supplied by the video signal processor 206). The memory may be a conventional random access memory (RAM) having a sufficient number of storage cells to hold one field of the luminance and chrominance signals Y' and C'.

Reference may be made to the aforesaid U.S. Pat. No. 4,638,360 for an explanation of the skew correction circuitry incorporated in the zoom processor block 208.

U.S. Pat. No. 4,266,242, entitled "TELEVISION SPECIAL EFFECTS ARRANGEMENT", describes an arrangement for generating memory write addresses for storing one frame of incoming television signal. Similar write address generating arrangement may be used for storing one field of component video signals Y' and C'. Basically, the memory addresses comprise of the horizontal or pixel write address component and the vertical or line write address component. The horizontal write address component starts with each horizontal sync pulse IHSP and is incremented by every clock pulse CLP. The vertical write address component starts with each vertical sync pulse IVSP and is incremented by every horizontal sync pulse IHSP.

The skew-corrected luminance and chrominance signals Y' and C' from the memory are applied to a functional block 210, which converts the digital input signals into the respective analog signals. The matrix circuitry, included in the block 210, processes the analog luminance and chrominance signals to generate the respective red, green and blue signals $R_2$, $G_2$ and $B_2$. In the zoom mode, the multiplexor 108, responsive to the fast switching signal FSS from the zoom processor 208, continuously applies the $R_2$, $G_2$ and $B_2$ signals to the kinescope 112. As long as the TV receiver remains in the zoom mode, the FSS signal remain high.

Figure 2:
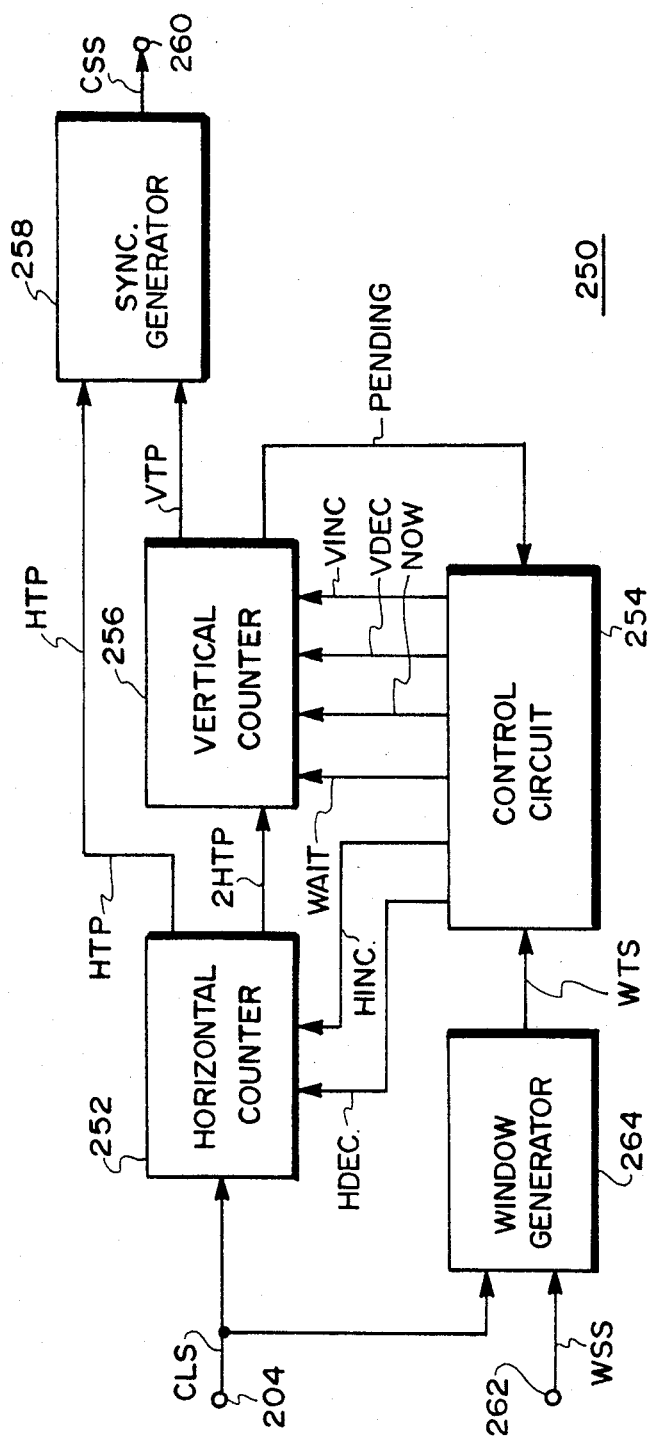
FIG. 2 depicts the details of the composite sync signal generating apparatus of FIG. 1.

The zoom processor 208 further includes circuitry 250, shown in FIG. 2, for internally generating a composite sync signal CSS in accordance with the principles of the present invention. The FIG. 2 circuitry 250 will be described in detail later.

The internally-generated composite sync signal CSS is coupled to the multiplexor 102 along with the incoming video signal CVS. In the zoom mode, the multiplexor 102 applies the composite sync signal CSS to the sync and deflection processor 106. The sync and deflection processor 106 generates deflection currents locked in phase to the horizontal and vertical sync components of the composite sync signal CSS (rather than those in the incoming video signal CVS).

It will be recalled that the multiplexor 108 blocks the $R_1$, $G_1$ and $B_1$ signals from the chroma/luna processor 104 during the zoom mode. Therefore, the application of the internally-generated composite sync signal CSS to the chroma/luma processor 104 in the zoom mode does not interfere with the zoom processing operation.

Figure 3:
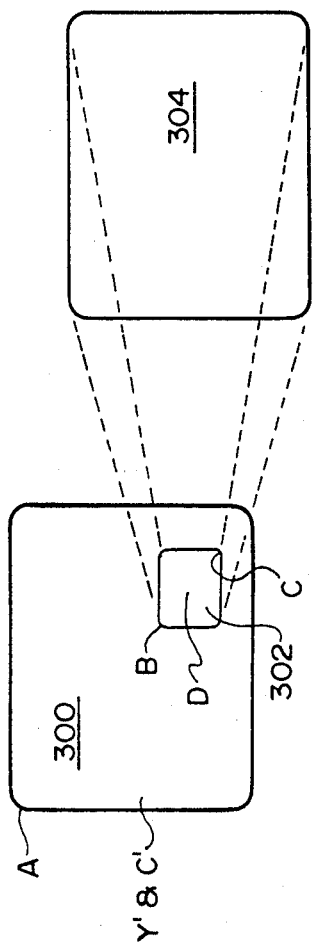
FIG. 3 is a conceptual representation of the zoom processing operation.

FIG. 3 is a conceptual representation of the zoom processing operation. The skew-corrected luminance and chrominance signals Y' and C' are stored in the field memory 300. In the zoom mode, the skew-corrected luminance and chrominance signals Y' and C' from a portion 302 of the memory 300 are read out under the control of the horizontal and vertical sync components of the internally-generated composite sync signal CSS, and displayed on the entire screen 304 of the kinescope 112. For a 3 to 1 zoom, every picture element in the zoomed portion 302 may be repeated 3 times to extend the zoomed portion horizontally, and each row in the zoomed portion may be repeated 3 times to stretch the zoomed portion in the vertical direction as can be seen from FIG. 3.

As previously mentioned, the use of the horizontal and vertical sync components of the incoming video signal CVS for timing the memory read operation and the deflection circuits of the kinescope 112 causes misalignment of the displayed image data. The clock pulses CLP's relative to the incoming sync signals IHSS and IVSS. The use of the internally-generated composite sync signal CSS eliminates the need for a second skew correction for the signals read out from the memory 300.

The memory read address generating arrangement is similar to the memory write address generating arrangement described above. There are, however, some differences. For example:

The horizontal and vertical timing information (HTP and VTP) from the internally-generated composite sync signal CSS (rather than the incoming sync signal) is used along with the clock pulse information for generating the read addresses.

The information is read out slowly—both horizontally and vertically. For 3 to 1 zoom, for example, horizontal read addresses are incremented once every three (3) clock pulses CLP's, and the vertical read addresses are incremented once every three (3) horizontal timing pulses HTP's. Basically, this causes each sample and each horizontal line to repeat three times to provide the requisite magnification.

The composite sync signal generation apparatus 250 will now be described in detail with reference to FIG. 2. The clock pulses CLP's, from either a burst-locked clock or an asynchronous clock, are applied to a horizontal counter 252. The horizontal counter 252 counts the incoming clock pulses and issues a horizontal timing pulse HTP everytime the clock pulse count CLPCNT reaches a horizontal count limit HCL. The horizontal count limit HCL is varied between 900 and 910 in response to the increase and decrease signals HINC and HDEC from a control circuit 254 in the manner described later. The reasons for restricting the horizontal count limit HCL to integer values between 900 and 910 will become clear later.

Additionally, the horizontal counter 252 issues a train of periodic timing pulses 2HTP's having twice the frequency of the horizontal timing pulses HTP's. It follows that the period of the 2HTP pulses is one-half of the period of the HTP pulses. The counter 252 issues a one-half horizontal time period pulse (i.e., a 2HTP pulse) everytime it counts to an integer number closest to the exact one-half value of the horizontal count limit HCL. For example, when HCL is equal to 910, the counter 252 counts to 455 before issuing a one-half horizontal period pulse. If HCL is equal to 901, the counter 252 may count to either 450 or 451 before issuing a one-half period pulse.

It will be understood that the counter 252 can be either an up-counter or a down-counter. An up-counter starts with a zero count, counts up to its preset limit, and starts over. A down-counter, on the other hand, starts with its established limit, counts down to zero and then restarts.

Figure 4:
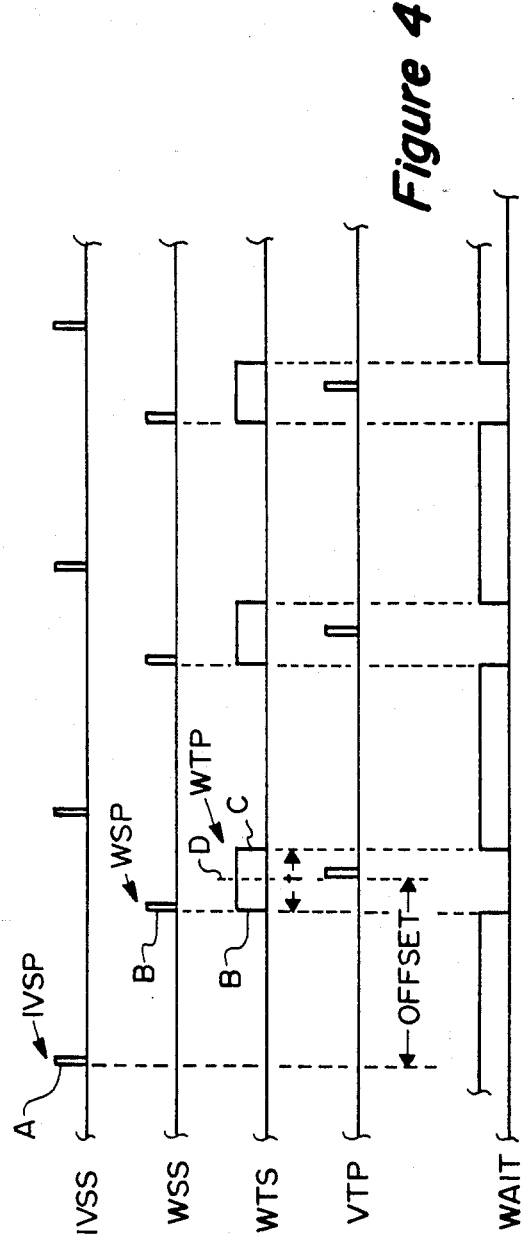
FIG. 4 are timing signal diagrams useful for understanding this invention.

A vertical counter 256, coupled to the output of the horizontal counter 252, counts the 2HTP (or one-half horizontal line period) pulses. The vertical counter 256 outputs a vertical timing pulse VTP everytime its count 2HTPCNT reaches a vertical count limit VCL during the occurrence of a window timing signal WTS as indicated in FIG. 4. The vertical count limit VCL is varied between 513 and 567 (not including 525), in steps of 2, in response to the increase and decrease signals VINC and VDEC from the control circuit 254, so as to cause the vertical timing pulse VTP to occur during the window timing pulses WTP's.

The horizontal and vertical timing pulses HTP's and VTP's are coupled to a conventional sync generator 258. The sync generator 258 generates the composite sync signal CSS (including horizontal and vertical synchronizing components) at its output terminal 260. Integrated circuits (IC's), which perform the functions of the sync generator 258, are of the type CA 3254 or CD 22402 marketed my RCA Solid State Division, Somerville, N.J.

In order to generate interlaced fields, the vertical field period is established at a value which is an odd multiple of one-half of the horizontal line period. This requirement is satisfied by making the vertical counter 256 count one-half horizontal line period pulses 2 HTP's, and by making the vertical count limit VCL an odd number (i.e., 513, 515 . . . 567). To this end, the vertical count limit VCL is varied between 513 and 567 in steps of two, but not including 525. The number 525 is excluded to prevent the sync IC 258 from entering the vertical countdown mode (i.e., to assume that the incoming video signal is in the NTSC standard format).

As previously indicated, the horizontal count limit HCL is varied between 900 and 910 in response to the control signals HINC and HDEC. There is always an integer number of clock pulses CLP's in the horizontal line period, and the number of clock pulses per line period remains fixed for all of the lines in a given field. The use of a fixed integral number of clock pulses in each line of a given field eliminates the need for a second skew correction on the signals read out from the memory 300. Any changes in the horizontal count limit HCL are made by the control circuit 254 only during the vertical retrace periods to avoid disturbances in the displayed images.

The zoom processing system on the subject invention, not only produces still pictures, but it is also capable of producing moving pictures. A moving zoom processing system that uses one field of memory, as is the case here, requires that the memory be read while it is being written—although at different locations and speeds. This requirement poses additional constraints on the vertical sync components of the internally-generated composite sync signal CSS.

It will be recalled that the memory writing operation is controlled by the horizontal and vertical sync components (IHSS and IVSS) of the incoming composite video signal CVS. The memory reading operation, on the other hand, is controlled by the horizontal and vertical timing components (i.e., HTP's and VTP's) of the internally-generated composite sync signal CSS. Furthermore, the speed at which the memory is read relative to the speed at which it is written varies. For instance, for a 3 to 1 zoom, the memory will be written at a rate that is three times the rate at which it is read out.

Because of the differences in the timing and speed of the memory writing and reading operations, there is a possibility that the writing operation may overtake the reading operation before the luma and chroma signals from a given field are completely read out. If that happens, a given displayed field will be formed from portions of two different fields.

The control circuit 254, responsive to the window timing signal WTS, serves to maintain a desired offset (see FIG. 4) between the vertical sync pulses IVSP's in the incoming composite video signal CVS and the vertical sync components VTP's of the internally-generated composite sync signal CSS. This offset, which is several lines wide, between the incoming vertical sync signals and the internally-generated vertical sync signals avoids signals being written over into the memory in the middle of the reading operation.

A window generator 264, responsive to a window start signal WSS, generates the window timing signal WTS. If the leading edge of an incoming vertical sync pulse IVSP corresponds to the beginning (point A) of the first line in the memory 300, the leading edges of the associated window start and timing pulses WSP and WTP may correspond to the beginning (point B) of the first line of the zoomed portion 302 of the memory in the manner indicated in FIGS. 3 and 4. The end of this window timing pulse WTP may then correspond to the end (point C) of the last line of the zoomed portion 302 of the memory 300. To this end, the window generator 264 may include a counter that starts with each window start pulse WSP and counts a given number of clock pulses CLP's.

As previously indicated, the control circuit 254 increases or decreases the horizontal and vertical count limits HCL and VCL to cause the vertical counter 256 to reach the vertical count limit VCL during the occurrence of the respective one of the window timing pulses WTP's. To this end, the control circuit 254 operates in the following fashion:

1. If the counter 256 reaches the vertical count limit VCL before the beginning B of the associated window timing pulse WTP, then the vertical count limit is increased by two (2) units and the horizontal count limit HCL is decreased by two (2) units. To this end, the control circuit 254 pulses the VINC and HDEC lines twice. The net increase in the vertical field period VFP is about 0.16% [i.e., (2/525−2/910)×100].

2. If the counter 256 does not reach the vertical count limit VCL prior to the end C of the associated window timing pulse WTP, then the vertical count limit is decreased by two (2) units and the horizontal count limit HCL is increased by two (2) units. To this end, the control circuit 254 pulses the VDEC and HINC lines twice. This step decreases the overall vertical field period VFP by about 0.16%.

3. If the counter 256 reaches the vertical count limit VCL in the first half of the associated window timing pulse WTP (between points B and D), then the horizontal count limit HCL is increased by one (1) unit, thereby increasing the vertical field period by about 0.11% [i.e., (1/910)×100]. To increase the horizontal count limit by one unit, the HINC line is pulsed once.

4. If the counter 256 reaches the vertical count limit in the second half of the associated window timing pulse WTP (between points D and C), then the horizontal count limit HCL is decreased by one (1) unit, whereby the vertical field period is decreased by about 0.11%. To decrease the horizontal count limit by one unit, the HDEC line is pulsed once.

In the operation of the FIG. 2 apparatus 250, changes in the vertical count limit VCL and the horizontal count limit HCL respectively provide a coarse correction and a fine correction for causing the vertical timing pulses VTP's to occur during the respective window timing pulses WTP's. Basically, the vertical count limit VCL is changed to bring the system to a point where the window timing pulses WTP's are occurring during the respective windows, and then the horizontal count limit HCL is changed to keep the vertical timing pulses occurring within a certain range (e.g., between points B and C).

When the vertical count limit VCL is reached before the beginning B of the window, the vertical count limit is increased by two units to extend the vertical field period VFP. The reason for increasing the vertical count limit VCL by two units is to force the vertical count limit to be an odd number, whereby an interlaced raster is generated. However, a two unit increase in the vertical count limit VCL increases the vertical field period VFP by 0.38% [i.e., (2/525)×100]. To avoid too large a step, the horizontal count limit HCL is decreased by two units. The overall change in the vertical field period VFP is about 0.16%. The opposite strategy is used when the vertical count limit VCL is not reached prior to the end of the associated window.

As previously indicated, all the changes in the vertical and horizontal count limits VCL and HCL are made only once during each field, and only during the occurrence of the vertical retrace intervals. This minimizes disturbances in the operation of the kinescope 112.

To prevent the vertical counter 256 from issuing a vertical timing pulse VTP outside the windows, the control circuit 254 sends a WAIT signal to the vertical counter. As shown in FIG. 4, the WAIT signal is a mirror image of the window timing signal WTS.

When the vertical counter 256 reaches the vertical count limit VCL before the beginning of an associated window, it communicates this fact to the control circuit 254 by means of a PENDING signal. When this happens, the vertical counter 256 issues a vertical timing pulse VTP at the next odd count after the WAIT signal goes low.

If the vertical count limit VCL is not reached prior to the end of an associated window, the control circuit 254 sends a NOW signal to the vertical counter 256 to force it to issue a vertical timing pulse VTP at the next odd count regardless of the fact that the WAIT signal is high. The NOW signal has a higher priority than the WAIT signal.

The control circuit 254 may be a microcomputer. The horizontal counter 252 may be a conventional counter circuit modified to process further inputs—HINC and HDEC. Similarly, the vertical counter 256 may also be a conventional counter circuit modified to process additional inputs—VINC, VDEC, NOW and WAIT, and to generate a further output—PENDING.

The composite sync signal CSS generated in accordance with this invention has two features. The clock-locked-line feature ensures that there is a fixed integer number of clock pulses in each line of a given displayed field. This feature eliminates the need for a second skew correction on the video signals read out from the memory.

The vertical-locked-vertical feature of the present invention makes sure that there is a desired offset between the incoming vertical sync pulses IVSP's and the respective one of the internally-generated vertical timing pulses VTP's. This feature prevents the writing operation from overtaking the reading operation before the signals from the zoomed portion are completely read out, thereby avoiding broken pictures.

The zoom processing system of the present invention is useful for generating full size still pictures. To this end, the zoom factor is set at 1 to 1. The memory writing operation is inhibited after one field of incoming video signal is written into the memory. The video signals from the memory are then repeatedly read out to produce a frozen picture.

What is claimed is:

1. A signal processing apparatus comprising:
a source of an incoming video signal including recurring horizontal and vertical sync pulses;
a source of clock pulses occurring at a rate that is substantially greater than the rate of occurrence of said horizontal sync pulses;
means coupled to said incoming video signal source, and responsive to said horizontal and vertical sync pulses, for generating window timing pulses occurring between successive vertical sync pulses;
a first clock pulse counting means coupled to said source of clock pulses for generating a horizontal timing pulse HTP everytime the clock pulse count reaches a horizontal count limit HCL; said first counting means further providing a train of one-half horizontal period timing pulses having twice the rate of occurrence as said horizontal timing pulses;
a second counting means coupled to said first counting means for counting said one-half horizontal period timing pulses and outputting a vertical timing pulse VTP everytime the one-half horizontal period pulse count reaches a vertical count limit VCL during the occurrence of said window timing pulses; and
control means coupled to at least one of said first and second counting means and responsive to said window timing pulses for incrementing and decrementing at least one of said horizontal and vertical count limits HCL and VCL in a manner causing said second counting means to reach said vertical count limit VCL during said occurrence of said window timing pulses.

2. The apparatus defined in claim 1 further including means coupled to said first and second counting means, and responsive to said horizontal and vertical timing pulses for generating a composite sync signal CSS; said apparatus additionally including a kinescope having electron beam deflection circuits coupled to said composite sync signal generating means.

3. The apparatus defined in claim 1 wherein said control means increases said horizontal count limit HCL when said second counting means reaches said vertical count limit VCL during the first half of the respective one of said window timing pulses, and decreases said horizontal count limit HCL when said second counting means reaches said vertical count limit VCL in the second half of the respective one of said window timing pulses.

4. The apparatus defined in claim 3 wherein said control means selectively increases and decreases said horizontal count limit HCL in steps of one (1) unit.

5. The apparatus defined in claim 1 wherein said control means increases said vertical count limit VCL when said second counting means reaches said vertical count limit VCL prior to the start of the respective one of said window timing pulses, and decreases said vertical count limit VCL when said second counting means does not reach said vertical count limit VCL before the end of the respective one of said window timing pulses.

6. The apparatus defined in claim 5 wherein said control means
increments said vertical count limit VCL by two (2) units and decrements said horizontal count limit HCL by two (2) units, when said one-half horizontal period pulse count reaches said vertical count limit VCL before the beginning of the respective one of said window timing pulses, and
decrements said vertical count limit VCL by two (2) units and increments said horizontal count limit HCL by two (2) units when said one-half horizontal period pulse count does not reach said vertical count limit VCL before the end of the respective one of said window timing pulses.

7. The apparatus defined in claim 1 wherein said incoming video signal is in the NTSC format; wherein said clock pulse rate is established at four (4) times the frequency of the unmodulated color subcarrier signal included in said incoming video signal; wherein said horizontal count limit HCL is set at one of the integer numbers near the number 910.

8. The apparatus defined in claim 7 wherein said vertical count limit VCL is set at one of the odd integer numbers near, but not including, the number 525.

9. The apparatus defined in claim 1 wherein said control means causes said second counting means to issue a vertical timing pulse VTP at the next available odd count after the beginning of the respective one of said window timing pulses if said one-half horizontal period pulse count reached said vertical count limit VCL before the beginning of said one window timing pulse.

10. The apparatus defined in claim 1 wherein said control means causes said second counting means to issue a vertical timing pulse VTP at the next available odd count after the end of the respective one of said window timing pulses if said one-half horizontal period pulse count did not reach vertical count limit VCL before the end of said one window timing pulse.

* * * * *

UNITED STATES PATENT AND TRADEMARK OFFICE
CERTIFICATE OF CORRECTION

PATENT NO. : 4,722,007

DATED : January 26, 1988

INVENTOR(S) : Russell Thomas Fling

It is certified that error appears in the above-identified patent and that said Letters Patent is hereby corrected as shown below:

Column 2, lines 16 and 17, that portion reading "internationally-generated" should read --internally-generated--;

Column 5, line 34, between "The" and "clock pulses" insert --misalignment is caused by variation in the phase of the--.

Signed and Sealed this

Eighteenth Day of October, 1988

Attest:

DONALD J. QUIGG

Attesting Officer

Commissioner of Patents and Trademarks